(12) United States Patent
Tang

(10) Patent No.: US 10,781,496 B1
(45) Date of Patent: Sep. 22, 2020

(54) COATING COMPOSITIONS FOR LEATHER SUBSTRATES

(71) Applicant: DecoArt, Inc., Stanford, KY (US)

(72) Inventor: Yue Man Tang, Lexington, KY (US)

(73) Assignee: DECOART, INC., Stanford, KY (US)

( * ) Notice: Subject to any disclaimer, the term of this patent is extended or adjusted under 35 U.S.C. 154(b) by 10 days.

(21) Appl. No.: 15/873,310

(22) Filed: Jan. 17, 2018

Related U.S. Application Data

(60) Provisional application No. 62/447,139, filed on Jan. 17, 2017.

(51) Int. Cl.
*C14C 11/00* (2006.01)
*C09D 133/02* (2006.01)

(52) U.S. Cl.
CPC .......... *C14C 11/003* (2013.01); *C09D 133/02* (2013.01)

(58) Field of Classification Search
CPC ............................ C14C 11/003; C09D 133/02
USPC ....................................................... 524/247
See application file for complete search history.

(56) References Cited

U.S. PATENT DOCUMENTS

| | | | | |
|---|---|---|---|---|
| 3,930,921 A | * | 1/1976 | Connett | B05D 1/286 |
| | | | | 156/234 |
| 6,465,563 B1 | * | 10/2002 | Mori | C08J 7/047 |
| | | | | 524/457 |
| 7,829,626 B2 | * | 11/2010 | Chiou | C09D 7/69 |
| | | | | 524/522 |
| 2009/0249724 A1 | * | 10/2009 | Remmele | C04B 40/065 |
| | | | | 52/309.17 |
| 2016/0369359 A1 | * | 12/2016 | Gallagher | C09D 4/06 |

\* cited by examiner

*Primary Examiner* — Hui H Chin
(74) *Attorney, Agent, or Firm* — Wyatt, Tarrant & Combs, LLP; Stephen C. Hall

(57) ABSTRACT

Disclosed herein are water-based, pigment-containing coating compositions for application over leather substrates including patent leather, such as but not limited to shoes, belts, purses, bags, wallets, and the like, comprising a combination of acrylic resins having glass transition temperatures at a lower end of the scale around 20-25° C. for flexibility with a balance of harder styrenated and non-styrenated acrylic resins, such coating compositions displaying chemical properties for both flexibility to bend with the leather substrates and gloss for excellent aesthetic appearance.

6 Claims, No Drawings

COATING COMPOSITIONS FOR LEATHER SUBSTRATES

CROSS REFERENCE TO RELATED U.S. APPLICATION

This patent application claims the benefit of priority to U.S. Provisional Patent Application Ser. No. 62/447,139, with a filing date of Jan. 17, 2017, the contents of which are incorporated herein by reference.

FIELD OF INVENTION

The field of the invention relates to coating compositions providing good aesthetic appearance, using a combination of acrylic resins having glass transition temperatures suitable for a preferred balance of gloss and flexibility, when applied over leather substrates including patent leather, such as but not limited to shoes, belts, purses, bags, wallets, and the like.

BACKGROUND

Various kinds of paints and coatings (the terms are used interchangeably in this disclosure) are used for a wide variety of purposes. The appearance and finish of these can range across a broad spectrum, depending on the substrate and the purposes for which the substrate is intended. Patent leather is a material (i.e., substrate in a coatings context) from which certain clothing items are sometimes made, such as shoes and belts, as well as certain accessory items such as purses and wallets. Often, there is a desire for the coating to be applied over these substrates, to adhere well to these substrates, and to impart on them a high gloss (shiny) appearance. For many articles that are formed from leather including patent leather, a high gloss combined with excellent flexibility lends itself to a more aesthetic appearance. Commonly, these articles are used in such a way that they need to bend and flex due to the motions a user will put them through. Therefore, it is not enough that the aesthetic is marked by a nice glossy appearance imparted by a coating. Rather, the function of the coating should also be flexible to match the range of motions that a user will commonly put the patent leather articles through.

Leather can be made from skins or hides from animals (e.g., cattle, sheep, goats, pigs, reptiles, ostrich, etc.) through processes known in the leather production field. Patent leather is a leather which has been treated with chemicals that render a high gloss appearance to the leather product. In a conventional process involving with forming patent leather, polyester diols are reacted with polyisocyanates to form a resin backbone. The isocyanate and hydroxyl groups contained in side chains of the backbone form bonds that add strength, elasticity, flexibility, and a high gloss appearance to the substrate, and impart other desirable properties such as good resistance to solvents, scratching and cracking. As well, other methods and techniques of forming and applying a patent leather treatment are known and practiced. In some instances, patent leather treatment is in the form of a varnish that contains dyes and other additives to impart additional qualities when applied to the substrate (e.g., through spraying, casting, brushing, etc.) and allowed to dry.

This treatment of an article provides a desirable and sustainable appearance to patent leather. But even with the improved appearance, there is a desire to apply other coatings to patent leather surfaces, for decoration or other aesthetic reasons. Accordingly, there is a desire for coatings that maintain or enhance the glossy appearance of patent leather, while retaining the flexibility needed to maintain good adhesion to the substrate, and which can be applied efficiently and effectively to patent leather surfaces. For example, many products that contain patent leather—belts and wallets, as examples—are, themselves, bendable. Therefore, it is also beneficial for the coatings used over these substrates to have flexibility and elasticity that impart bendability on the coating, just as the substrate is also bendable. Further, there is a need for environmentally-conscious coatings suitable for these purposes, including use on patent leather surfaces and substrates. Also, there is a need for these coatings to exhibit suitable rheological characteristics, in order to promote ease of application, adhesion to the substrate, and acceptable gloss ratings after drying.

These and other features and advantages will be evident from the disclosure contained herein.

SUMMARY OF EMBODIMENTS AND ADVANTAGES

Coating compositions formed according to the present embodiments are water-based coatings that contain a cross-linking resin backbone (polymer or copolymers, e.g., acrylic) and a cross-linking initiator, combined with rheology modifiers, plasticizes, surfactants, and various additives to impart both appearance and functional effects as well as other desired characteristics on the coating. Advantages of water-based coatings include not only environmental and rheological considerations as discussed above, but also reduced cost of materials used for making the coatings. The subject coating compositions optionally contain an aqueous dispersion of pigment particles such as titanium dioxide with a pigment spacer suitable as a gloss reduction agent for water-based coatings.

In some embodiments, such a composition contains cross-linking acrylic and acrylic emulsion copolymers, some of which are styrenated, wherein the acrylic content is about 40%-70% by weight of the total formulation, and in some embodiments about 41%-66%. In some embodiments, the styrenated acrylic polymer makes up about 40%-75% of the acrylic polymer content, and in some embodiments the styrenated acrylic polymer makes up about 50%-74% of the acrylic polymer content. Further, coatings of the present embodiments include at least one network-forming rheology modifier, as part of a composition comprising acrylic resins having glass transition temperatures that enhance flexibility of the coating composition, when applied over leather substrates, while retaining an acceptable gloss levels.

Accordingly, present embodiments address the needs for a particular category of substrates, namely those formed from patent leather and similar materials. Various examples are provided of coating that can be formed according to the present embodiments, and then applied over substrates, including leather substrates, including patent leather substrates, in accordance with methods set forth herein.

MULTIPLE EMBODIMENTS AND ALTERNATIVES

Coatings which are suitable for application over patent leather are described and disclosed herein. Common structural features of these coatings include an acrylic or polyurethane resin suitable for water-based, pigment-containing coatings with a suitable lower-molecule weight solvent such as glycol ethers (i.e., alkyl ethers of ethylene glycol). In this sense, water-based coatings can contain around 10%-12% or less of organic solvent content.

The coating compositions of present embodiments are further characterized by the use of one or more rheology modifiers to provide consistent thickness to limit viscosity drop from shearing as the compositions are mixed, and adhesion promoters for enhanced performance on a flexible substrate. It is intended that such coatings will be applied to a surface when wet, and allowed to dry. Drying can be done in conventional ways, including exposure to ambient air and exposure to heat. Various choices of colors can be selected from and the choice of these is not limiting.

A number of ingredients to be used in the coatings of the present embodiments are well known. Herein, exemplary product names are provided for some ingredients, with the realization that various substitutes could be used for any. The role of some ingredients in a viable coating composition are used with such regularity that little explanation is necessary, albeit again one could easily find suitable substitute. Additional discussion is provided for some ingredients that either are not used with the same regularity in coating compositions, or are more centrally related to the novel features of the present embodiments.

Present embodiments include those wherein the coating formulation contains a combination of resins that provide flexibility and gloss. Several resins have high glass transition temperatures ($T_g$), e.g., around or exceeding 60° C. Such resins will increase the overall glossy appearance of the coating after application and drying. Examples are Alberdingk AC 2322 providing multi-phase components the Tg of which can differ, and EPS 2272 (from Engineered Polymer Solutions) providing a poly-styrenated cross-linking resin the properties of which are typically harder than non-styrenated resins having similar functionality and purpose.

However, because these are harder resins, they do not have the flexibility and bendability needed for patent leather substrates. Because of the movement and twisting that wallets, shoes, and purses often undergo, the coating should also be able to bend and twist to maintain coverage over the substrate. To provide this feature, a softer resin such as Alberdingk AC 2356 is provided, having a $T_g$ around 20° C. This is an acrylic resin with a lower Tg that makes it more flexible than the styrenated acrylic resins mentioned above as having a higher $T_g$. In some embodiments, a non-styrenated acrylic resin having a $T_g$ below around 25° C. is suitable for these purposes. Likewise, a common feature of the ingredients is their high solids content. Alberdingk AC 2356 has a solids content of about 50%, while Alberdingk AC 2322 and EPS 2272 are in a range of about 45-50% solids, adding to the glossy appearance upon curing.

The styrenated (e.g., Alberdingk AC 2356) and non-styrenated (e.g., Alberdingk AC 2322, EPS 2272) acrylic polymers provide a combination of glossy finish and bendability, with the non-styrenated acrylic polymer (or, polymers) content being the softer. In some embodiments, an acrylic content of about 40%-70% by weight of the total formulation is used, and more particularly as desired about 41%-66% for this range. In some embodiments, the styrenated acrylic polymer makes up about 40%-75% of the acrylic polymer content, and more particularly in some embodiments the styrenated acrylic polymer makes up about 50%-74% of the acrylic polymer content.

Present embodiments also include those wherein a polyurethane polyol resin contained in a dispersion suitable for water-based coatings and pigments is mixed with an aqueous solvent-based system to form a backbone allowing for necessary cross-linking to adequately cure the coating composition. Tego™ Variplus DS 50 (Tego products available from Evonik Corporation North America, Parsippany, N.J.) is a polyurethane resin that provides one such option. An initiator such as dimethylethanolamine (DMEA)—a tertiary amine—and hydroxyl-containing molecule that reacts with polymers and copolymers—is suitable for enhancing the cross-linkage of the inventive coating compositions.

It will be appreciated that maintaining a sufficient consistency for patent leather is one of the challenges of applying such coatings to these substrates. Accordingly, it is beneficial and desirable to use one or more rheology modifiers that maintain the thickness and consistency of the composition even during the mixing and grinding of the various parts. Particular qualities of one or more suitable rheology modifiers include solvent-free or limited solvent content, resistance to gloss reduction, and thickness-maintaining balance along a spectrum of shear rates that includes high shear. Accordingly, in some embodiments Coapur™ XS 71 (Coapur™ products available through the Coatex Arkema Group), a solvent free water-soluble non-ionic polyurethane thickener, is used as a pseudo plastic rheology modifier because it is compatible with pigments and limits viscosity drop after addition of pigment. Likewise, Coapur™ 2025 can be used in combination with a rheology modifier such as Coapur™ XS 71 to retain the gloss characteristics of the coating compositions, and Tafigel™ PUR 85 (Munzing, Bloomfield, N.J.) is another suitable rheology modifier that serves as a binder and can be used in combination with others that is a non-ionic polyurethane for water-based systems. Additionally, Rheotech™ 2800 (Coatex Arkema Group, Chester, S.C.) is a rheology modifier that can be employed in combination with others to provide additional balance between high, medium and low shear rates. Rheology modifiers of the kind disclosed here offer advantages in terms of the ability to brush the inventive coatings onto a substrate. In this way, the coatings offer favorable flow and leveling for application to patent leather substrates.

As desired, various plasticizers and wetting agents can be incorporated into the inventive coating compositions. These include, but are not limited to, Rhoplex WP-1 (Dow®), Optifilm™ 400 (Eastman Chemical Company), or other suitable plasticizers, a non-ionic surfactant such as Metolat 750 (Munzing, Bloomfield, N.J., or other suitable wetting agents), and Tego® Twin 4200 or other low VOC additive that provides good substrate wetting and is non-foaming.

Without limitation, the following are non-limiting examples of coating compositions according to multiple embodiments and alternatives, with desirable flexibility and gloss properties that adhere suitably to leather objects once applied. The order in which the constituents appear in the accompanying table is not necessarily the order in which they are mixed, nor is each part necessarily combined together in separate stages. But in some embodiments, Part A contains surfactants and other additives such as Triton X-405, a non-ionic surfactant, and thickeners that are activated by an activator such as DMEA. Such would include defoamers as known and commonly used in the art are also employed according to multiple embodiments herein, and may comprise up to about 1% by weight of the composition. In some embodiments, as shown in the example composition, the defoamers are BYK® 024 and BYK® 022, and others which are commercially available.

Part B comprises resins possessing acrylic functionality, both styrenated and non-styrenated, the proportions of which are useful for achieving a functional balance between gloss and flexibility when the coatings are applied over leather substrates. The remaining parts of each example composition provide for various pigments, solvents, dispersants to facilitate formation of a film-like surface, and thickeners collectively providing adhesion of the coating film to the substrate with proper viscosity for application. It is expected that persons having ordinary skill in the art will employ much latitude and will be able to consider many options in the selection of constituents and weight percentages in forming coatings according to present embodiments. The only limitations on the scope of embodiments for such options is found in the claims in this application or future application(s) claiming priority to this application.

| Example 1 - coating composition | | |
|---|---|---|
| | Constituents | Wt % |
| PART A Mix: | Water | 5.30% |
| | Dimethylethanolamine (DMEA) | 0.12% |
| | Triton X-405 | 0.34% |
| | Disperbyk 2015 | 0.71% |
| | Afcona 6225 | 0.56% |
| | BYK ® 024 | 0.29% |
| | BYK ® 022 | 0.17% |
| | Agitan 786 | 0.13% |
| | Nuosept 495 | 0.15% |
| Add, grind: | | |
| PIGMENTS | T-200 Rutile Titanium Dioxide | 12.24% |
| | Hydrite TS 90 | 1.43% |
| Mix above with: | | |
| PART B | Alberdingk AC 2322- | 9.79% |
| | EPS ® 2272 | 6.12% |
| | Alberdingk AC 2356 | 42.54% |
| Form as premix to be mixed with above under slight agitation: | | |
| PART C | Glycol Ether DB | 3.67% |
| | tripropylene glycol monomethyl ether | 0.93% |
| | Propylene glycol | 5.61% |
| Mix above with: | | |
| PART D | Optifilm 400 | 1.02% |
| | Rhoplex WP-1 | 1.73% |
| | Tego Variplus DS 50 | 1.53% |
| | Metolat 750 | 0.31% |
| | Tego Twin 4200 | 0.31% |
| | 30% DC 51 Waterbase solution | 0.49% |
| | Water | 2.56% |
| Mix above with: | | |
| PART E | Coapur XS 71 | 0.44% |
| | Coapur 2020W | 0.82% |
| | Tafigel Pur 85 | 0.51% |
| | Rheotec 2800 | 0.18% |
| | TOTAL: | 100% |

| Example 2 - coating composition | | |
|---|---|---|
| | Constituents | Wt % |
| PART A Mix: | Water | 4.90% |
| | Dimethylethanolamine (DMEA) | 0.13% |
| | Triton X-405 | 0.33% |
| | Disperbyk 2015 | 0.61% |
| | Afcona 6225 | 0.61% |
| | BYK ® 024 | 0.28% |
| | BYK ® 022 | 0.17% |
| | Agitan 786 | 0.11% |
| | Nuosept 495 | 0.15% |

| Example 2 - coating composition (continued) | | |
|---|---|---|
| | Constituents | Wt % |
| Add, grind: | | |
| PIGMENTS | Hydrite TS 90 | 2.75% |
| | Hydrite UF 90 | 1.21% |
| Mix above with: | | |
| PART B | Alberdingk AC 2322 | 9.91% |
| | EPS 2272 | 7.16% |
| | Alberdingk AC 2356 | 48.54% |
| Form as premix to be mixed with above under slight agitation: | | |
| PART C | Glycol Ether DB | 4.64% |
| | Dowanol TPM | 0.97% |
| | Propylene glycol | 5.52% |
| Mix above with: | | |
| PART D | Optifilm 400 | 1.32% |
| | Rhoplex WP-1 | 1.66% |
| | Tego Variplus DS 50 | 1.32% |
| | Metolat 750 | 0.33% |
| | methyl-,mono(3,5,5-trimethylhexyl ether) | 0.33% |
| | 30% DC 51 Waterbase solution | 0.54% |
| | Water | 3.57% |
| Mix above with: | | |
| PART E | Coapur XS 71 | 0.54% |
| | Coapur 2020W | 1.47% |
| | Tafigel Pur 85 | 0.54% |
| | Rheotec 2800 | 0.39% |
| | TOTAL: | 100% |

| Example 3 - coating composition | | |
|---|---|---|
| | Constituents | Wt % |
| PART A Mix: | Alberdingk AC 2356 | 28.67% |
| | Dimethylethanolamine (DMEA) | 0.14% |
| | Triton X-405 | 0.23% |
| | BYK ® 024 | 0.46% |
| | Nuosept 495 | 0.16% |
| Mix with: | | |
| PART B | EPS 2272 | 9.17% |
| | Alberdingk AC 2322 | 11.35% |
| | Alberdingk AC 2356 | 20.64% |
| Form as premix to be mixed with above under slight agitation: | | |
| PART C | Glycol Ether DB | 4.01% |
| | Dowanol TMP | 1.15% |
| | Propylene glycol | 6.31% |
| Mix above with: | | |
| PART D | Optifilm 400 | 1.61% |
| | Rhoplex WP-1 | 1.49% |
| | Tego Variplus DS 50 | 0.92% |
| | Metolat 750 | 0.34% |
| | Tego Twin 4200 | 0.40% |
| | 30% DC 51 Waterbase solution | 0.57% |
| | Water | 9.97% |
| Mix above with: | | |
| PART E | Coapur XS 71 | 0.48% |
| | Coapur 2020W | 1.15% |

-continued

Example 3 - coating composition

| Constituents | Wt % |
|---|---|
| Tafigel Pur 85 | 0.44% |
| Rheotec 2800 | 0.23% |
| Adjust viscosity with: | |
| Tafigel PUR 60 | 0.11% |
| TOTAL: | 100% |

In one aspect according to multiple embodiments and alternatives, methods for forming such inventive coating compositions include, but are not limited to, mixing the ingredients of PART A and adding (where the formulation calls for it) PIGMENT and pigment spacer such as Hydrite® TS 90 (Imerys Kaolin, Roswell, Ga.) then mixing the resultant mixture with PART B. In turn, PART C is mixed next, followed by PART D, and finally PART E additives and rheology modifiers to obtain desired thickness and consistency. Before adding subsequent parts, mixing is done under sufficient agitation. The dispersants of Part D interacting with a resin such as Alberdingk AC 2356 having a Tg around 20° C. facilitates the adhesion of the coating composition directly to leather substrates and help provide the balance between flexibility for bending with substrate and gloss for desirable appearance. If desired, a primer coat may be applied to the substrate prior to the coating composition, but good adhesion is achievable without use of primer.

It will be appreciated that the balance achieved with the inventive coatings is a balance between gloss and flexibility, with gloss being associated with a coating's hardness. Hardness can be characterized as a discernible resistance of a coating to a mechanical force, such as pressure or rubbing from an object contacting the coating surface. A determination of hardness is generally associated with damping effects, which are due to pressure created when an object contacts a surface of a coating. An example is a ball (or more than one) positioned at the end of a pendulum arm for each ball, the arm or arms swinging back and forth over a coated surface. As a ball contacts the surface of the coating at the nadir of the arc on each pass of the pendulum arm, energy is absorbed in proportion with the elasticity of the coating. For standardization, damping effects typically are correlated with the time (in seconds) for the pendulum's arc to become reduced to a specific pre-determined value in degrees, for example in going from an initial deflection at 6° to a deflection of 3°. The more elastic (flexible, bendable) the coating, the weaker the damping effects. Conversely, low elasticity is associated with stronger damping effects. This is sometimes known as the Konig hardness test, which provides a rating for a coating's hardness over a standard scale. In some embodiments, the inventive coatings when undergoing the standardized test described above demonstrate a Konig hardness of about 50-100 seconds, in accordance with testing and evaluation methods known to persons of ordinary skill in this field.

The embodiments described herein further include applying the coating composition to a leather substrate. Tools for such application include without limitation, brushes and other suitable applicators as known in the art. One such type of end user would be an individual obtaining the coating compositions in the form of paints from a specialty store, who would use various kinds of applicator as desired for coverage of the paint over some or all of the leather substrate. Ambient air and/or heat may be used to dry the paint over a period of time suitable for complete curing, which in some embodiments may be overnight, or may be done more quickly with heating.

Although examples of coating compositions according to the present embodiments are provided, these are in no way limiting of the scope of the embodiments, but rather are offered to help illustrate the breadth of the teachings contained herein. Other constituents having similar properties to those disclosed herein are within the scope of present embodiments.

It is to be understood that the embodiments described and/or claimed herein are not limited in their application to the details of the teachings and descriptions set forth herein, or as illustrated in an example. Rather, it will be understood that the embodiments are capable of being practiced or carried out in multiple ways, according to many alternatives based on these descriptions and teachings.

Further, it will be understood that the phraseology and terminology used herein is for the purpose of description and should not be regarded as limiting. The use herein of "including," "comprising," "e.g.," "such as, for example," "containing," or "having" and variations of those words is meant in a non-limiting way to encompass the items listed thereafter, and equivalents of those, as well as additional items. Accordingly, the foregoing descriptions are meant to illustrate a number of embodiments and alternatives, rather than limiting to the precise forms and processes disclosed herein. The descriptions herein are not intended to be exhaustive. It will be understood by those having ordinary skill in the art that modifications and variations of these embodiments are reasonably possible in light of the above teachings and descriptions.

What is claimed is:

1. A method of coating, comprising applying to a leather substrate a coating comprising styrenated and non-styrenated acrylic polymers, wherein the acrylic polymer content of the composition is between about 40%-70% by weight and the styrenated portion is between about 50%-74% by weight of the acrylic polymer content of the composition.

2. The method of claim 1, wherein the acrylic content is about 41%-66% by weight of the composition.

3. The method of claim 1, wherein the coating has a Konig hardness of about 50-100 seconds at complete curing.

4. The method of claim 2, wherein the coating has a Konig hardness of about 50-100 seconds at complete curing.

5. The method of claim 1, wherein the substrate is a patent leather substrate.

6. The method of claim 1, wherein applying the coating comprises brushing the coating over the substrate.

* * * * *